July 31, 1923.
A. E. HENDERSON
1,463,528
DEVICE FOR AND METHOD OF THE MANUFACTURE OF PROTECTED INNER TUBES FOR TIRES
Filed Dec. 26, 1916
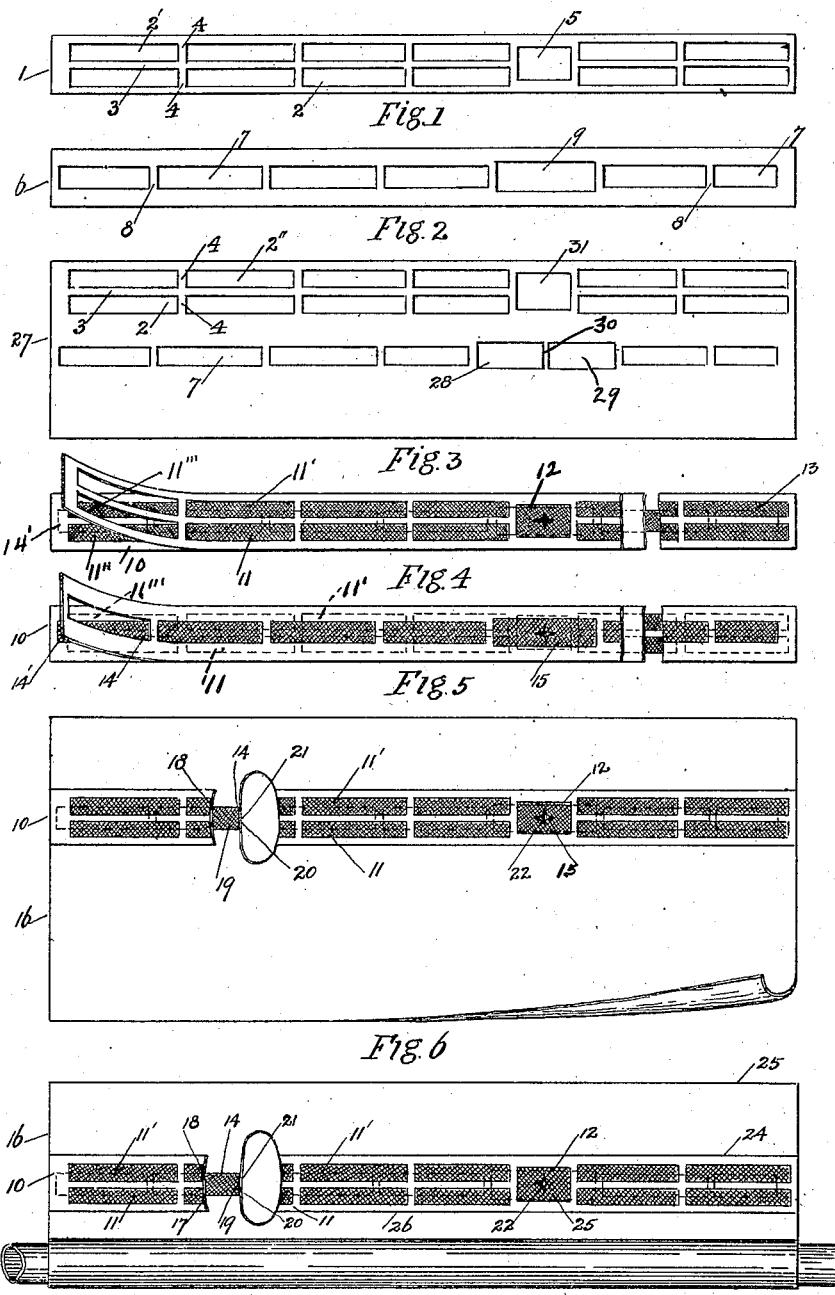
Inventor
Albert E. Henderson Patented July 31, 1923.

1,463,528

UNITED STATES PATENT OFFICE.

ALBERT ENNIS HENDERSON, OF TORONTO, ONTARIO, CANADA.

DEVICE FOR AND METHOD OF THE MANUFACTURE OF PROTECTED INNER TUBES FOR TIRES.

Application filed December 26, 1916. Serial No. 139,007.

*To all whom it may concern:*

Be it known that I, ALBERT ENNIS HENDERSON, a subject of the King of Great Britain, residing at Toronto, Province of Ontario, Canada, having invented certain new and useful Improvements in Devices for and Method of the Manufacture of Protected Inner Tubes for Tires, do hereby declare that the following is a full, clear, and exact description of the same.

My invention relates to improvements in the method of manufacturing inner tubes in which are imbedded protecting fabrics, and more particularly to that form of protection in which the fabric strips are imbedded in the tube in overlapping or staggered form.

Among the objects of my invention are:—

First. To provide a template or device which will assure the proper position of each strip of fabric in the tube.

Second. To arrange the template in such manner that the fabric may be placed on opposite sides of a sheet of rubber in proper relation to each other.

Third. To provide means whereby the strips may be uniformly imbedded in the tube when the same is rolled up.

Fourth. To distribute the rubber of the tube uniformly around its circumference in such manner that the same amount of rubber will be used as in the ordinary tube.

Fifth. To so construct the tube that the only addition to the tube will be the fabric properly imbedded and positioned within the rubber of the tube.

In my co-pending application of 12th instant I have shown a tube the fabric of which is imbedded and spaced longitudinally, transversely and radially by means of the device shown herein.

I attain these and other objects by the mechanism illustrated in the accompanying drawings in which:

Fig. 1 is a plan view of the template showing the slots which determine the position of one series of strips.

Fig. 2 is a template showing the slots which determine the position of the co-operating strips.

Fig. 3 is a modified form of the template in which both forms are included in the same template.

Fig. 4 is a plan view of the strip of rubber showing the fabric in place on one side of the strip.

Fig. 5 is a plan view of the reverse side showing the fabric strips in place.

Fig. 6 is a plan view of a sheet of rubber showing the rubber strip with the adhering fabric strips placed in its proper position on the sheet.

Fig. 7 is a plan view showing the method of rolling up the tube.

Similar reference characters refer to similar parts throughout the several views.

In Fig. 1 I have shown the template 1 having the slots 2 and 2' separated transversely by the bars 3 and longitudinally by the bars 4 and 4'. Near to one end of the template I show the slot 5 adapted to receive one of the strips of fabric for the valve base. The length of the template corresponds with the length of the rubber of the tube, while in width it represents the extent of the rubber strip upon which the fabric strips are to be placed.

In Fig. 2 I show the template 6 having the slots 7 and the transverse separating bars 8 and the valve base slot 9. The template 6 corresponds in outside dimensions to that shown in Fig. 1.

In Fig. 4 is shown the strip of rubber 10 corresponding in size to the templates 1 and 6, showing the fabric strips 11 and 11' positioned on its surface, also the base 12 shown in its proper relation to the other strips. The co-operating strips 13 on the reverse side of Fig. 4 are shown in dotted lines.

In Fig. 5 I have shown the reverse side of the rubber strip 10 having the fabric strips 14 and the base portion 15 positioned on the surface in proper relation to the co-operating strips shown in Fig. 4 and in dotted lines in Fig. 5 on the reverse side of the strip.

In Fig. 6 I have shown the rubber sheet 16 and in proper position on the surface of the same is shown the sheet of rubber 10 with the adhering strips 11, 11' and 14 attached thereto in proper relation to each other. Fabric strips 11 and 11' have been broken away at the point 17 showing at 18 the rubber of the strip 10 located between the strips 11, 11' and 14, thus separating the fabric strips from each other radially when the tube is completed, while at 19 is shown the strip 14 which is broken away at 20 together with the rubber of the sheet 16, showing at 21 the rubber beneath the strip 14. The fabric strips 12 and 15 are shown apertured at 22 to provide for the reception of the button of the valve stem from without the tube.

In Fig. 7 the tube is shown in process of being rolled up on the pole 23 the diameter of which is such that when the strip 10 with its attached fabric is reached in the process of rolling there will be one thickness of rubber between the pole and the fabric strips 11 and 11' which appear on the surface of the strip 10. The remaining portion of the sheet 16 between the edge 24 of the superimposed strip 10 and the edge 25 of the sheet 16 is of such proportions that it will not overlap the strip 10 in the further rolling of the pole 23, but will come to the edge 26 of the said strip 10; thus the rubber will be uniformly distributed around the tube and radially will be found in uniform layers outside of and between the fabric strips.

Referring to Figs. 4 and 5, the end 14' of the strip 14 extends nearer to the end of the rubber sheet 10 than do the ends 11'' and 11''' of the strips 11 and 11'. The reverse is the condition at the other end of the strip, the result being that when the ends of the tube are joined together the fabric will overlap in the same manner as in intermediate parts of the tube.

In these figures the templates are shown at the left with their ends upturned, as they would appear in the act of removing them from the strip of rubber after the adherence of the fabric strips to the rubber strip has been effected. Moreover at intermediate points said figures are broken away to show portions of the templates and related portions of the strips.

In Fig. 3 is shown a modified template 27 which combines in one template the construction shown in Figs. 1 and 2. I have shown a modified construction of the valve base seat in which the slots 28 and 29 are separated by the bar 30, which is positioned transversely centrally in the space 31; thus showing a modified relation of the fabric strips at the valve base. The size of the template 27 and the relative positions of the slots in the template 27 are such that when removed from the sheet of rubber after the fabric strips have been placed in position the several strips will be in such relation to each other and to the edges of the rubber sheet that when rolled upon the pole 23 not only will the strips be properly positioned transversely, radially and longitudinally but the rubber of the sheet will be evenly distributed around the tube as in the operations already herein described in connection with the other forms of template.

It will be seen that I have provided a means whereby the fabric to be imbedded within the tube may be properly positioned and the rubber of the tube uniformly distributed and each strip will be found in its proper relationship to the other strips and to the rubber of the tube. Thus by the use of the templates which are provided herewith the operator is enabled to secure uniformity in the manufacture of the tubes and to simplify the work of the construction of any tube in which fabric is thus imbedded.

I do not confine myself to the construction set forth and described in the specifications and drawings as the same may be modified without departing from the spirit of my invention. It is also to be understood that the templates may be made of any suitable material adapted to the convenience of the operator, it being understood that the templates serve as positioning means to properly locate the fabric strips on the rubber strip, preliminary to the application of the strip to the rubber sheet and the rolling of the latter on the pole or mandrel, the openings or slots constituting seats of the proper size and form to receive the fabric strips and hold them in proper relations while their adherence to the rubber strip is being effected.

I claim:—

1. A device of the character described, comprising a template adapted to be laid upon a sheet of rubber, slots being provided in the template for the insertion of fabric to contact the surface of the rubber, and means for forming the rubber and fabric into a tube.

2. A device of the character described, comprising a template for arrangement upon a sheet of rubber and provided with slots, whereby fabric elements corresponding in shape to the slots in the template may be inserted through the slots upon the surface of the rubber, a co-operating template corresponding in size with the first template and being provided with slots adapted to receive fabric so positioned that when applied to the reverse side of the rubber sheet the series of fabric strips will be in overlapping formation.

3. A device of the character described consisting of a pair of co-operative templates provided with seats for the reception of separate fabric elements, said seats being arranged in over-lapping formation, substantially as set forth.

4. A device of the character described, comprising a pair of templates for arrangement upon a sheet of rubber and slotted in staggered relation to receive fabric strips, and means for rolling said rubber and fabric into a tube so that the relation of the fabric strips will correspond to the staggered relation of the template slots.

5. A device of the character described, comprising a template for application to a sheet of rubber corresponding in dimensions to the template, slots being provided in the template for the reception of fabric strips corresponding in size thereto and means for forming the same into a tube.

6. Means for positioning fabric reinforcing strips in a rubber tube which consists in a template provided with seats for the fabric elements, and adapted to be applied to the surface of a sheet of rubber preliminary to the rolling thereof.

7. Means for positioning fabric reinforcing strips in a rubber tube which consists in co-extensive templates provided with fabric receiving seats disposed in overlapping staggered relations and adapted to be applied to a rubber sheet prior to the rolling thereof.

8. Means for positioning fabric reinforcing strips in a rubber tube which consists in templates for arrangement upon opposite sides of a rubber strip and provided with fabric receiving openings forming seats disposed in overlapping relations, the strip with attached fabric being adapted to be rolled into a sheet of rubber.

9. The method of reinforcing tire tubes which consists in applying to opposite surfaces of a rubber sheet templates provided with openings arranged in overlapping relations, arranging fabric strips in said openings in contact with the rubber sheet, removing the templates and finally rolling the said sheet to embed the fabric strips in the described relation.

10. The method of reinforcing tire tubes which consists in applying to opposite sides of a rubber strip templates provided with openings arranged in overlapping relation, arranging fabric elements in said openings to position them upon said strip, removing the templates, applying the rubber strip and attached fabric elements to a rubber sheet, and rolling the latter to incorporate the former.

11. The method of forming fabric reenforced tubes comprising positioning on a sheet of rubber two series of fabric strips so that individual strips will be in crossing relation in the completed tube, and rolling said sheet into a tube, substantially as set forth.

In testimony whereof I have hereunto affixed my signature in the presence of two witnesses.

ALBERT ENNIS HENDERSON.

Witnesses:
 A. Woods,
 B. C. Marwood.